3,227,696
PHOSPHOROUS AND CHLORINE-CONTAINING COPOLYMERS AS LUBRICANT ADDITIVES
Dervin L. Flowers, Redwood City, and Lyman E. Lorensen, Orinda, Calif., assignors to Shell Oil Company, New York, N.Y., a corporation of Delaware
No Drawing. Original application Feb. 26, 1960, Ser. No. 11,139, now Patent No. 3,151,078, dated Sept. 29, 1964. Divided and this application June 29, 1964, Ser. No. 379,017
3 Claims. (Cl. 260—80.5)

This application is a division of copending patent application Serial No. 11,139 filed February 26, 1960, now U.S.P. 3,151,078.

The invention relates to a new class of oil-soluble polypolar polymers having a long linear hydrocarbon backbone chain having attached to different carbon atoms in the chain dissimilar polar groups one of which is a phosphono-containing group and the other being a polar containing oil-solubilizing group. Novel copolymers of the present invention are useful in improving hydrocarbon liquids with respect to detergent, extreme pressure, pour point depression, viscosity-temperature and anti-wear properties and the like.

It is an object of the invention to provide a new class of useful polymers and particularly oil-soluble polymers. It is a further object to provide new polymers which are useful as multifunctional additives for liquid hydrocarbons such as lubricating oils and fuel compositions.

It has now been discovered that objects of the invention are accomplished by the novel polymers having a plurality of recurring dissimilar units as represented by the following:

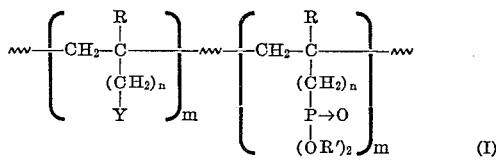

wherein R is hydrogen or a $C_{1-5}$ alkyl radical, or a halogen atom or an amino group, R' is hydrogen, or a hydrocarbyl or halo-substituted hydrocarbyl radical, e.g., alkyl, aryl, aralkyl, alkaryl or cycloalkyl or halo derivatives thereof such as chloro or bromo alkyl radical having from 1 to 18, preferably 2–8 carbon atoms, and Y is an oil-solubilizing radical containing a $C_{8-20}$ alkyl radical (R'') attached indirectly to the backbone chain through a polar group such as

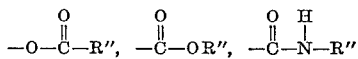

or the like, n is zero or 1 and m is a whole number. The molecular weights of the polymers vary from about 5,000 to about a million, preferably from 25,000 to 80,000.

The oil-soluble polymers having the above recurring dissimilar units shown in Formula I are prepared by copolymerizing (1) a monoolefinically polymerizable phosphonate monomer, such as a vinyl or allyl phosphonate, and (2) a polymerizable oleophilic long-chain alkyl ester or amide of an alpha,beta-unsaturated acid such as an ester of amide of acrylic acid or methacrylic acid or maleic anhydride or fumaric acid or ester of a lower unsaturated alcohol, such as vinyl alcohol and allyl alcohol, and a long chain fatty acid or corresponding amide. The mole ratio of (1) to (2) can vary from 1:10 to 10:1, preferably 1:4 to 4:1, respectively.

The polymerizable phosphono monomers include mono or bis-(hydrocarbyl or halohydrocarbyl)vinyl or allyl-phosphonates such as mono(ethyl)vinyl acid phosphonate, mono(butyl)vinyl acid phosphonate, mono(octyl)vinyl acid phosphonate, mono(cyclohexyl)vinyl acid phosphonate, mono(phenyl)vinyl acid phosphonate, mono(benzyl)vinyl acid phosphonate, mono(omega-chloroethyl)vinyl acid phosphonate, mono(omega-chlorobutyl)vinyl acid phosphonate, mono(omega-chlorooctyl)vinyl acid phosphonate, bis(ethyl)vinyl phosphonate, bis(butyl)vinyl phosphonate, bis(benzyl)vinyl phosphonate, bis(omega-chloroethyl)vinyl phosphonate, bis(omega-chlorobutyl)vinyl phosphonate, bis(omega-chloroethyl)allyl phosphonate, bis(benzyl)allyl phosphonate, bis(cyclohexyl)allyl phosphonate and mixtures thereof.

The other (non-phosphono) polymerizable monomer, containing oleophilic components containing an aliphatic hydrocarbon chain of at least 8 carbon atoms which is not part of the main hydrocarbon polymer chain includes polymerizable esters, and/or amides of unsaturated acids. Suitable esters include acrylic or alkacrylic esters of aliphatic alcohols of at least 8 carbon atoms, preferably of from 10 to 20 carbon atoms, and include, inter alia, decyl acrylate, lauryl acrylate, stearyl acrylate, eicosanyl acrylate, docosanyl acrylate, decyl methacrylate, lauryl methacrylate, cetyl methacrylate, stearyl methacrylate, and the like, and mixtures thereof. Small amounts, not more than 20%, of the monomers just described such as $C_{8-18}$ alkyl acrylates or methacrylates can be replaced with lower $C_{1-4}$ alkyl acrylates or methacrylates such as methyl or butyl methacrylates in order to improve the viscosity temperature properties of the final copolymer of this invention.

Other substances include the vinyl esters of long-chain carboxylic acids such as vinyl laurate, vinyl palmitate, vinyl stearate, vinyl oleate and the like and mixtures thereof; long-chain esters of vinylene dicarboxylic acids such as methyl lauryl fumarate; and methyl stearyl maleate, N-long chain hydrocarbon substituted amides of unsaturated acids such as N-stearyl methacrylamide, N-lauryl methacrylamide, N-stearyl acrylamide and the like. These components can be employed alone or in various combinations. The technical lauryl methacrylate obtained from the commercial mixture of long-chain alcohols in the $C_{10}$ to $C_{18}$ range derived from coconut oil is an especially useful oleophilic component of the copolymer. The group of acrylic and alkacrylic esters of aliphatic alcohols of at least eight carbon atoms are, in general, well suited as the oleophilic component of the copolymer.

The reaction temperature may vary from ambient temperature to 150° C. and the reaction time may vary from a fraction of an hour to over 72 hours until the reaction is complete.

The following examples are given as representative preparations of polymers of the invention.

*Example I*

A mixture of lauryl methacrylate, stearyl methacrylate, methyl methacrylate and bis($\beta$-chloroethyl)vinyl phosphonate in the mol ratio of 3.2/2.2/3/1, respectively, was reacted in the presence of ditertbutyl peroxide (0.30%) at 120° C. for 24 hours. The unreacted monomers were removed by distillation. The recovered oil-soluble copolymer had a molecular weight of about 100,000. Analysis of the copolymer indicated mol ratios of the monomers entering into the polymer to be 3/2/3/0.3, respectively.

*Example II*

A mixture of vinyl stearate, vinyl laurate and bis($\beta$-chloroethyl)vinyl phosphonate in the mol ratio of 2/3/1, respectively, was reacted under the conditions of Example I. The recovered polymer product was oil-soluble and had a molecular weight of about 200,000 and the mol ratio of the reactants were 2/3/0.35.

Following the procedure of Examples I and II, other polymers were prepared in accordance with the following tabulation:

| Example | Catalyst | Temp., °C. | P-C Containing Monomer [a] | Oil-Solubilizing Monomers [a] |
|---------|----------|------------|----------------------------|-------------------------------|
| III | Benzoyl peroxide | 100 | Bis($\beta$-chloroethyl)vinyl phosphonate (1) | Allyl stearate (2). |
| IV | Ditertbutyl peroxide | 120 | do | N-stearyl methacrylamide. |
| V | do | 100 | do | Vinyl stearate (1) $\beta$-stearyl methacrylate (1). |
| VI | do | 100 | Bis(butyl)vinyl phosphonate (1) | stearyl methacrylate (4). |
| VII | do | 100 | Bis($\beta$-chloroethyl)allyl phosphonate (1) | Stearyl methacrylate (2). |
| VIII | Benzoyl peroxide | 100 | Bis(benzyl)vinyl phosphonate (1) | Vinyl stearate (2). |
| IX | do | 80 | Mono($\beta$-chloroethyl)vinyl phosphonate (1) | Do. |
| X | do | 90–100 | Mono(chloro-phenyl)vinyl phosphonate (1) | Vinyl laurate (3). |
| XI | do | 100 | Mono(cyclohexyl)vinyl phosphonate (1) | Vinyl stearate (1) vinyl laurate (1). |

[a] The figures in ( ) indicate the mol ratio of the starting monomer which in the end product is essentially the same.

The novel polymers are effective as extreme pressure, anti-wear and detergent additives in liquid hydrocarbon compositions such as mineral lubricating oil in the range of from about 0.001% to about 10%, preferably from about 0.02% to about 5% by weight. The lubricating stock for this purpose can be any natural or synthetic hydrocarbonaceous material having lubricating properties. Thus, the base may be a hydrocarbon oil within a wide viscosity range, e.g., 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of polybasic organic and inorganic acids, e.g., di-2-ethylhexyl sebacate, dioctyl phthalate, trioctyl phosphate; polymeric tetrahydrofuran; polyalkyl silicone polymers, e.g., dimethyl silicone polymer and the like. In addition the base can be gasoline, fuel oils or greases.

The outstanding properties of oil compositions of this invention were demonstrated when a mineral lubricating oil containing 2% of additive of Example I (Composition A) or 2% of additive of Example II (Composition B) were found to have VI values of about 140 as compared to 92 for the neat oil and in the L-4 engine test Compositions A and B gave clean engines with no evidence of wear or corrosion or sludge formation, whereas a commercial detergent oil containing a metallic detergent (sulfonate) tested under the same engine test conditions resulted in severe corrosion and sludge formation in the engine.

We claim as our invention:
1. An oil-soluble copolymer of vinyl stearate and bis($\beta$-chloroethyl)vinyl phosphonate having a molecular weight of from about 25,000 to about 800,000.
2. An oil-soluble copolymer of vinyl stearate, vinyl laurate and bis($\beta$-chloroethyl)vinyl phosphonate having a molecular weight of from about 25,000 to about 800,000.
3. An oil-soluble copolymer of a bis($\omega$-chloroalkyl) vinyl phosphonate and at least one vinyl ester of a long-chain fatty acid having from 8 to 20 carbon atoms.

References Cited by the Examiner
UNITED STATES PATENTS

| | | | |
|---|---|---|---|
| 2,091,627 | 8/1937 | Bruson | 252—56 |
| 2,125,885 | 8/1938 | Bruson | 260—86.1 |
| 2,407,954 | 9/1946 | Fenske et al. | 260—86.1 |
| 2,439,214 | 4/1948 | Lindsey | 260—461 XR |
| 2,600,420 | 6/1952 | Neher et al. | 260—85.7 |
| 2,854,434 | 9/1958 | Beaman | 260—461 |
| 2,888,434 | 5/1959 | Shashoua | 260—461 XR |
| 2,956,952 | 10/1960 | Fitzgerald | 260—461 XR |
| 2,999,085 | 9/1961 | King et al. | 260—461 XR |
| 3,037,963 | 6/1962 | Christenson | 260—72 |
| 3,043,821 | 7/1962 | Coover et al. | 260—461 |

OTHER REFERENCES

Kabachnik, Chemical Abstracts, vol. 42 (1948), column 4132.

LEON J. BERCOVITZ, *Primary Examiner.*

CHARLES B. PARKER, FRANK M. SIKORA, RALPH A. WHITE, *Assistant Examiners.*